(12) United States Patent
Wu

(10) Patent No.: US 7,236,038 B2
(45) Date of Patent: Jun. 26, 2007

(54) PULSE GENERATOR AND METHOD FOR PULSE GENERATION THEREOF

(75) Inventor: Shu Fang Wu, Hsinchu (TW)

(73) Assignee: Elite Semiconductor Memory Technology Inc., Hsinchu (TW)

( * ) Notice: Subject to any disclaimer, the term of this patent is extended or adjusted under 35 U.S.C. 154(b) by 114 days.

(21) Appl. No.: 11/155,608

(22) Filed: Jun. 20, 2005

(65) Prior Publication Data

US 2006/0284664 A1   Dec. 21, 2006

(51) Int. Cl.
 *G06F 1/04* (2006.01)
(52) U.S. Cl. ........................ 327/291; 327/172
(58) Field of Classification Search ............... None
See application file for complete search history.

(56) References Cited

U.S. PATENT DOCUMENTS

| 3,921,010 | A | * | 11/1975 | Griffin .................. 327/59 |
| 5,467,039 | A | * | 11/1995 | Bae .................... 327/198 |
| 5,721,502 | A | * | 2/1998 | Thomson et al. ........ 327/143 |
| 6,121,803 | A |   | 9/2000 | Tanaka |
| 6,204,704 | B1 | * | 3/2001 | Williams et al. ........ 327/143 |
| 6,903,615 | B2 | * | 6/2005 | Landman et al. ......... 331/57 |

* cited by examiner

*Primary Examiner*—Cassandra Cox
(74) *Attorney, Agent, or Firm*—Volentine & Whitt, PLLC

(57) ABSTRACT

A pulse generator comprises a CMOS inverter, a capacitive device and a resistive device, where the CMOS inverter has two terminals connected to a source voltage and a reference voltage, e.g., ground, respectively, the capacitor device and the resistive device are connected to the input end of CMOS inverter, and pulses are generated at the output end of the CMOS inverter. The capacitive device is charged by a boost signal and discharged through the resistive device, so as to manipulate a potential at the input end of the CMOS inverter to control the operations of the transistors included in the CMOS inverter, thereby changing the level of the output voltage of the CMOS inverter. The widths of the pulses can be adjustable by a control signal received by the resistive device.

23 Claims, 6 Drawing Sheets

PULSE GENERATOR AND METHOD FOR PULSE GENERATION THEREOF

BACKGROUND OF THE INVENTION

1. Field of the Invention

The present invention relates to a pulse generator and the method for pulse generation thereof, more particularly to a pulse generator and the method for generating pulses with adjustable pulse widths.

2. Description of the Related Art

Pulse generator circuits are commonly used in integrated circuit applications for generating electrical pulse signals that are triggered as a result of an input clock signal. Referring to FIG. 1, a traditional pulse generator 1 comprises a delay unit 12 and a NAND gate 11, where the delay unit 12 is intended to invert and delay an input signal Pin as $\overline{Pd}$ by a certain internal time, and the NAND gate 11 receives the input signal Pin and the delayed signal $\overline{Pd}$ and then outputs an output signal Pout through a NAND operation. A symbol "⁻" put at a head of the signal name means a negative logic signal.

The structure of the delay unit 12 may be configured as shown in FIG. 2(a) or FIG. 2(b). Referring to FIG. 2(a), odd number of inverters INV are connected in series to form a delay unit 12. Referring to FIG. 2(b), odd number of pairs with combinations of an inverter INV and a resistor R are connected in series to form as an alternative. FIG. 3 shows a timing chart of the input signal Pin, the delayed signal $\overline{Pd}$, and the output signal Pout. The pulse width of the output signal Pout depends on the number of the inverters INV of the delay unit 12, and once a delay unit 12 of FIG. 2(a) or FIG. 2(b) is constructed in the traditional pulse generator 1, the pulse width of the output signal Pout is fixed. FIG. 3 also shows the traditional pulse generator 1 operating at the rising edge of the input signal Pin. If input signal's falling edge operation is required for the traditional pulse generator 1, the NAND gate 11 in FIG. 1 could be replaced with a NOR gate.

U.S. Pat. No. 6,121,803 discloses a pulse generator according to the source voltage Vcc from 0V to 3V (or 5V) to reliably generate the pulse signal according to power on or the reset of the power. However, the pulse width changes when the slew rate of Vcc is not well controlled. Also the time required to boost the source voltage Vcc from 0V to 3V (or 5V) is in the order of a microsecond or above, which is not suitable for the applications operated with the pulse width below a microsecond. The prior arts mentioned above need many inverters or many transistors to generate pulses with desired width, which thus increases the circuit complexity and cost.

SUMMARY OF THE INVENTION

The primary objective of the present invention is to provide a pulse generator with reduced number of transistors to generate a series of pulses in wide-range width. The second objective of the present invention is to provide a pulse generator to generate a pulse with adjustable width by a controlled signal.

In order to achieve the objectives, a pulse generator is disclosed. The pulse generator comprises a CMOS inverter, a capacitive device and a resistive device, where the CMOS inverter has two terminals connected to a source voltage and a reference voltage, e.g., ground, respectively, the capacitive device and the resistive device are connected to the input end of CMOS inverter, and pulses are generated at the output end of the CMOS inverter. The input end of CMOS inverter is coupled through the capacitive device 4 by an input signal, e.g., a voltage rising from 0V to 3 or 5V in nanoseconds, and is discharged through the resistive device 5. Thus, the potential at the input end of the CMOS inverter is manipulated to control the operations of the CMOS inverter, and thereby the voltage level of the output end. The widths of the pulses can be adjusted by controlling the input end signal received through the capacitive device 4 and discharged by the resistive device 5, and thus the widths could be reduced down to a nanosecond ($10^{-9}$ second) level.

BRIEF DESCRIPTION OF THE DRAWINGS

The invention will be described according to the appended drawings in which.

PREFERRED EMBODIMENT OF THE PRESENT INVENTION

Figure 1:
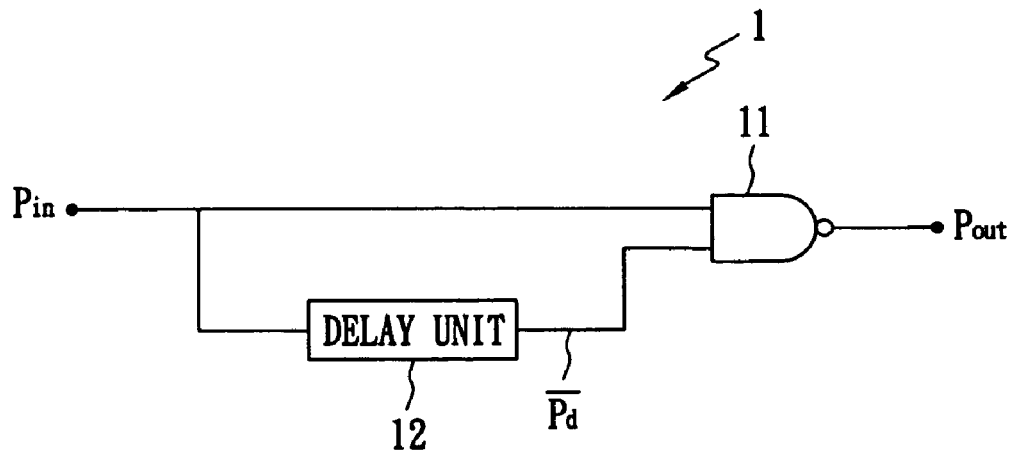
FIG. 1 shows a circuit diagram of a known pulse generator.
Figure 2A:
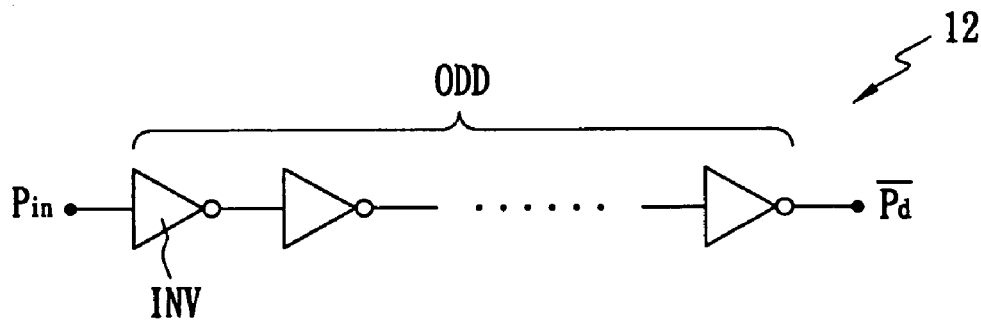
FIGS. 2(a) and 2(b) exemplify the circuit of the delay unit of FIG. 1.
Figure 2B:
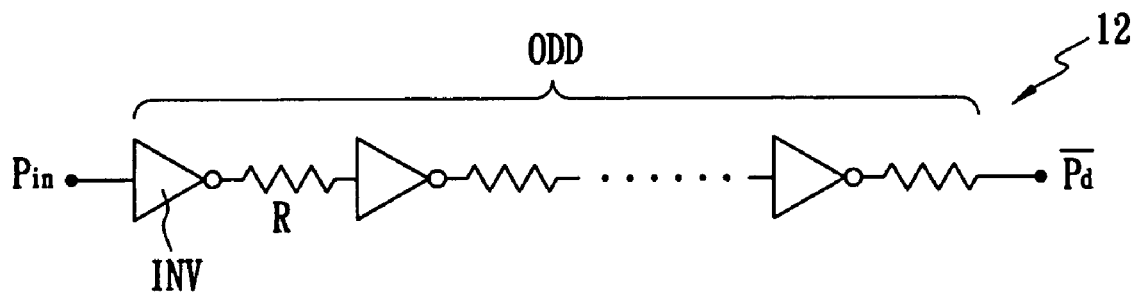
Figure 3:
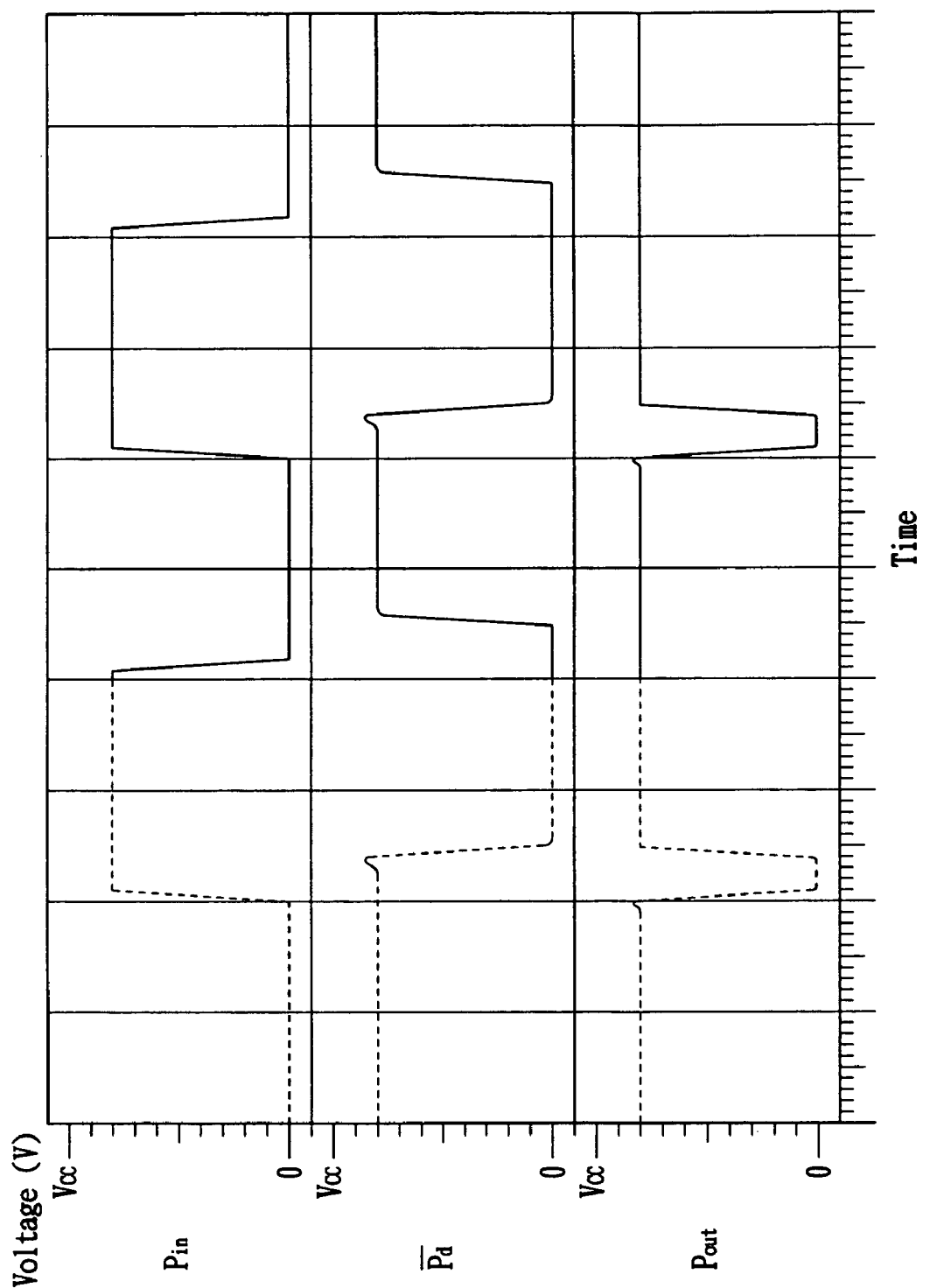
FIG. 3 shows a timing chart for the known pulse generator of FIG. 1.
Figure 4:
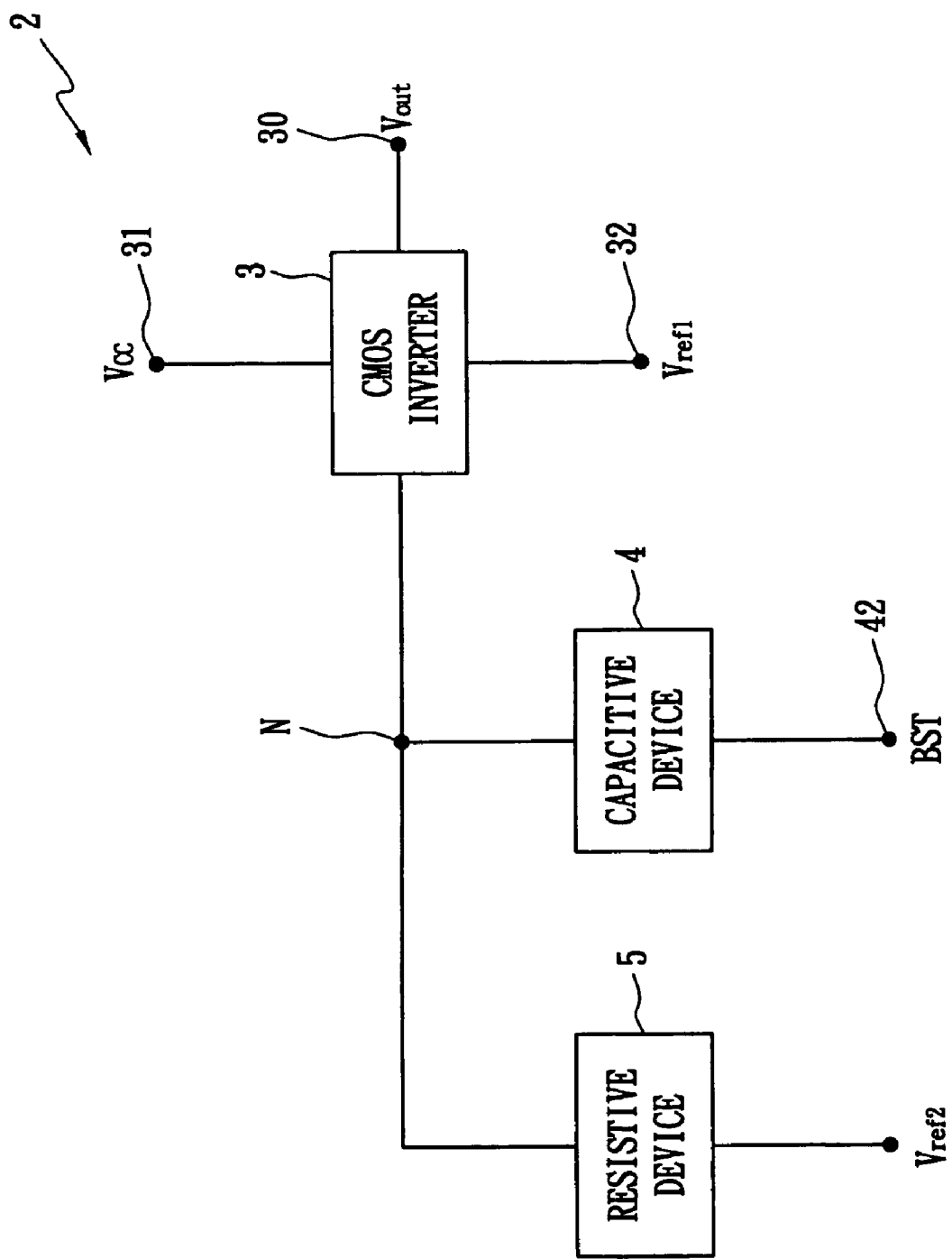
FIG. 4 shows a block diagram of the pulse generator of the present invention.

FIG. 4 shows a block diagram of a pulse generator 2 of the present invention. The pulse generator 2 comprises a CMOS inverter 3, a capacitive device 4 and a resistive device 5. The CMOS inverter 3 comprises a first terminal 31 being connected to a source voltage Vcc and a second terminal 32 being connected to a reference voltage $V_{ref1}$. The output end 30 of the CMOS inverter 3 outputs pulses, Vout. One end 42 of the capacitive device 4 receives a boost signal BST, and the other end N is connected to the input end of the CMOS inverter 3. One end of the resistive device 5 is connected to the node N, and the other end is connected to a reference voltage $V_{ref2}$.

Figure 5:
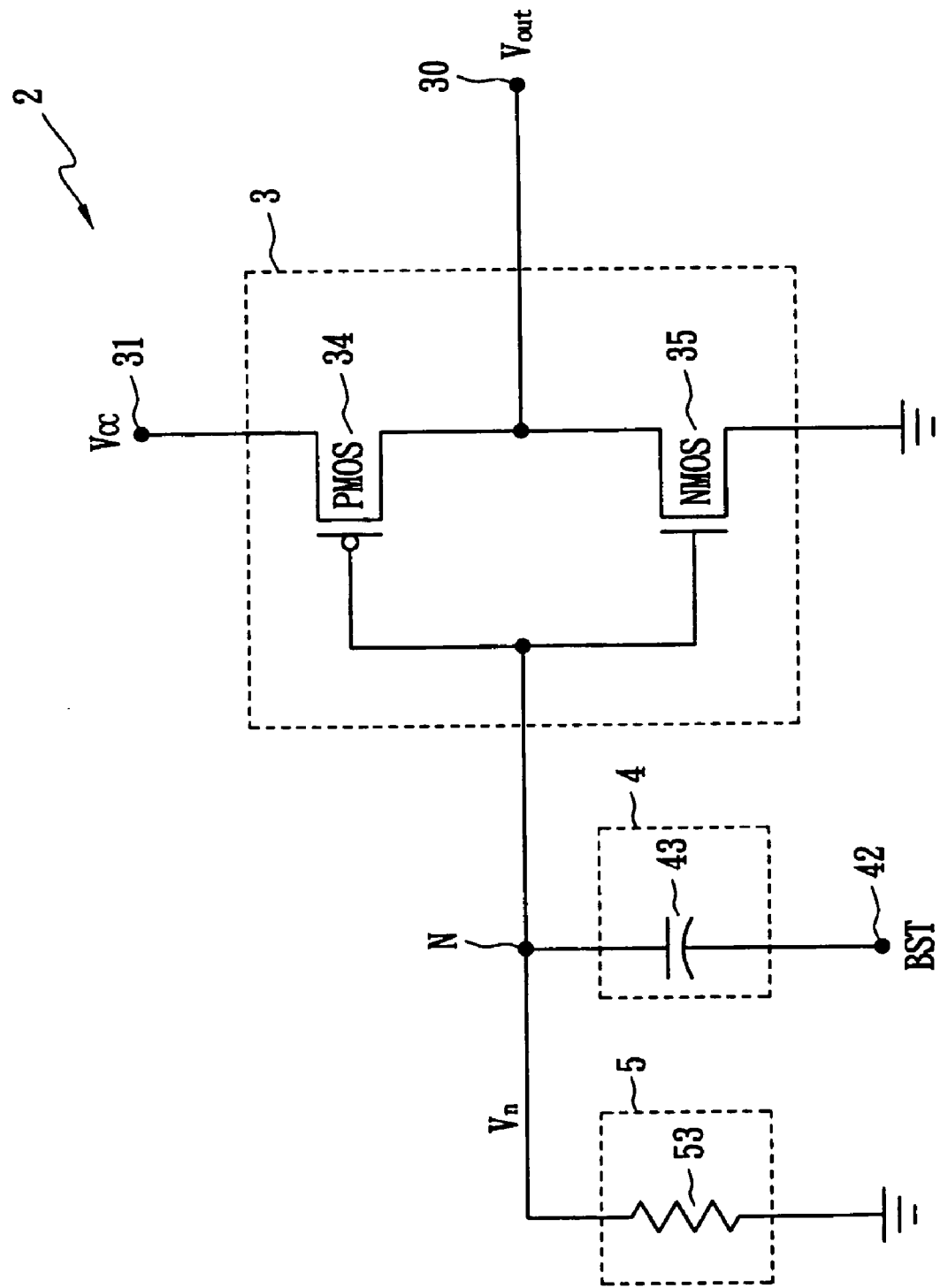
FIG. 5 shows an embodiment of the pulse generator of the present invention.

FIG. 5 shows an embodiment of the pulse generator 2 of the present invention. The CMOS inverter 3 comprises a PMOS transistor 34 and a NMOS transistor 35. Both gate electrodes of the PMOS transistor 34 and the NMOS transistor 35 connect to the input end thereof, i.e., both gate electrodes are electrically connected to the node N. The first terminal 31 is supplied with a source voltage Vcc. The $V_{ref1}$ and $V_{ref2}$ are grounded in this embodiment. A capacitor 43 of capacitance C acts as the capacitive device 4, and a resistor 53 of resistance R acts as the resistive device 5. The pulse generator 2 is used in a power up ready state, that is, the applying source voltage Vcc is stable.

Figure 6:
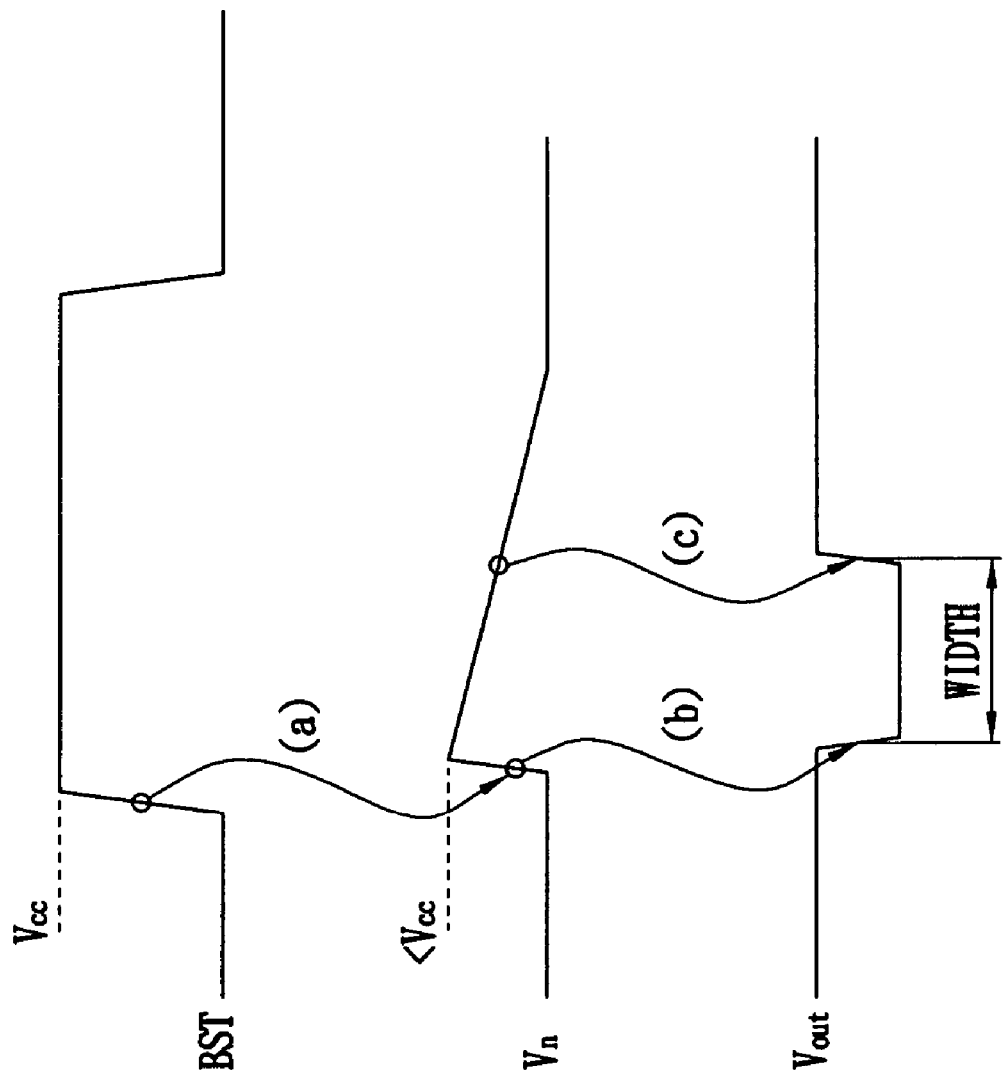
FIG. 6 shows a timing chart explaining an operation of the pulse generator in FIG. 5.

FIG. 6 shows a timing chart explaining an operation of the pulse generator in FIG. 5, indicating the voltage levels of the input end 42, the node N, and the output end 30, respectively. Initially, the voltage Vn is at low level and no charge is stored in the capacitor 43. Vout at the output terminal 30 is at high level and equivalent to Vcc because the PMOS transistor 34 is in a conductive state. As indicated by the index (a) in FIG. 6, when the voltage of the boost signal BST increases from 0V to Vcc, Vn coupled by signal BST through the capacitor 43 will increase to a certain voltage level, which depends on the capacitance C of the capacitor 43 and is usually lower than Vcc. As indicated by the index (b), if the voltage level of Vn is higher than the threshold voltage of the NMOS transistor 35, the NMOS transistor 35 changes to be in a conductive state and the PMOS transistor 34 changes to be in a non-conductive state. Consequently, the output end 30 is electrically connected to the second terminal 32, which is grounded in this embodiment, so that the Vout is down to low level. After that, as indicated by the index (c), the voltage level in node N is gradually charged to ground through the resistor 53, and consequently Vn decreases. When Vn is below the threshold voltage of the NMOS transistor 35, i.e., the charges stored in the capacitive device is lower than the threshold value, the NMOS transistor 35 changes to be in a non-conductive state, whereas the PMOS transistor 34 changes to be in a conductive state. Therefore, Vout changes from low to high level (Vcc). The dissipating rate of the charges in the capacitor 43, determines the width of the pulse of Vout.

In this embodiment, the boost signal BST is used as a rising edge-triggered signal. Nevertheless, the boost signal BST can also be implemented at its falling edge.

Figure 7:
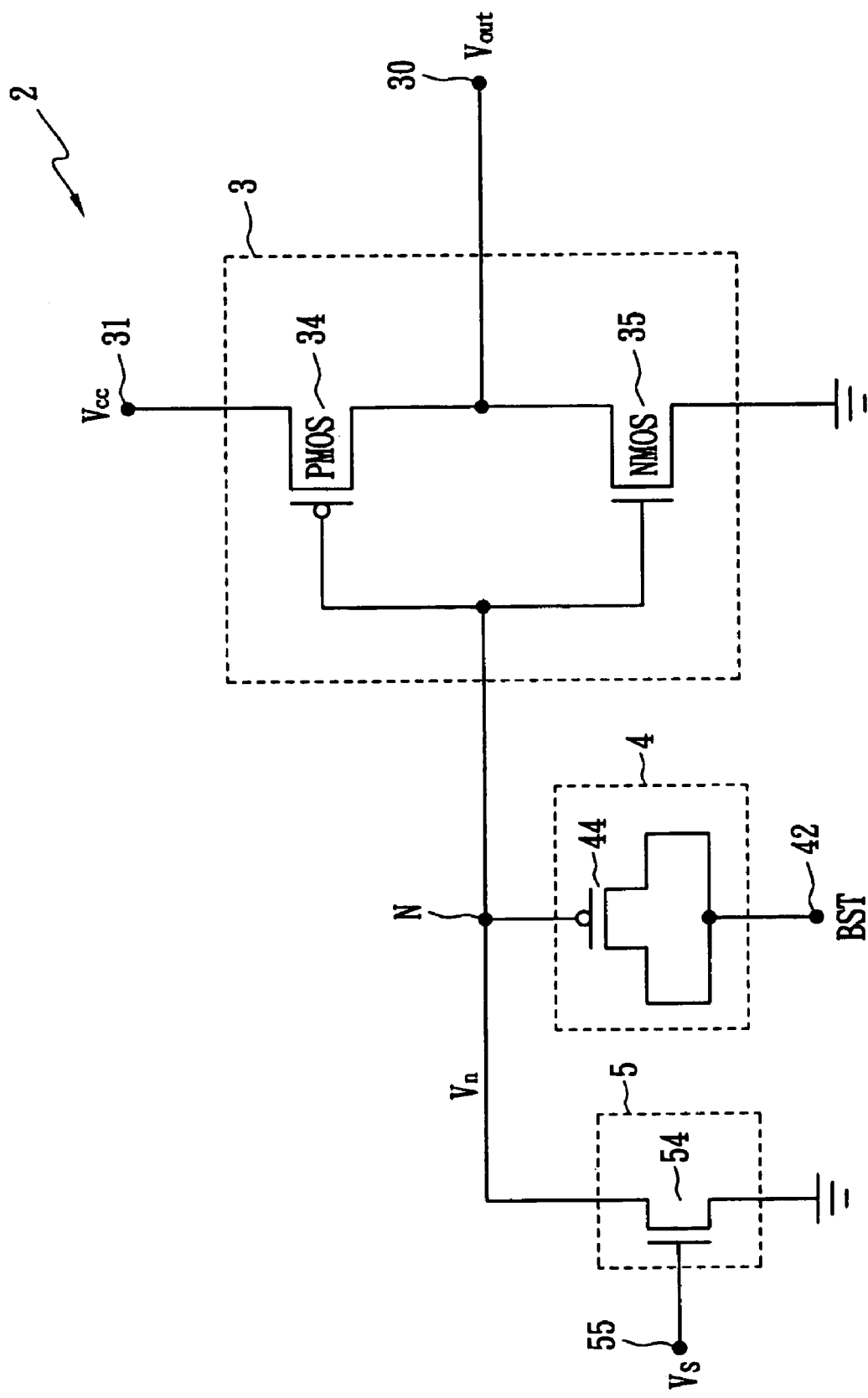
FIG. 7 shows another embodiment of the pulse generator of the present invention.

FIG. 7 shows another embodiment of the pulse generator 2 of the present invention. The capacitor 43 and the resistor 53 in FIG. 5 are replaced with a PMOS transistor 44 as a capacitor and a NMOS transistor 54 as a resistor, respectively. The drain and source electrodes of the MOS transistor 44 are connected to the input end 42 to receive the boost signal BST. The gate electrode of the MOS transistor 44 is connected to the node N. When in operation, a controlled signal Vs, which is higher than the threshold voltage of the MOS transistor 54, is applied to the gate electrode 55 of the MOS transistor 54 to make the MOS transistor 54 to be in a conductive state. Hence, there is a discharge path through the MOS transistor 54 to the ground. Therefore, the charges stored in the MOS transistor 44 will be discharged. In this embodiment, the pulse width of Vout can be adjusted by the controlled signal Vs. The larger the controlled signal Vs is, the larger the current leakage is, and thus there is a higher discharging rate of the charges in node N. As a result, the width of the pulse decreases. The adjustment of the controlled signal Vs could be tunable during operation of the pulse generator 2. The width of the pulse of Vout is also determined by the capacitance C' of the MOS capacitor 4. The larger capacitance C' is, the wider the pulse of Vout is. Moreover, the width of the pulse of Vout can also be adjusted by changing the resistance of the MOS transistor 54 configured in FIG. 7.

The transistor type PMOS or NMOS is as described if the gate of the MOS capacitor connected to the input end N. It is still feasible to invert the MOS capacitor connections, the source/drain connected to the node N and the gate connected to the boost input end 42, then the MOS transistor type would be different!

The advantages of the pulse generator 2 of the present invention over the traditional pulse generator 1 are (1) the pulse width of Vout is adjustable during operation, and (2) the number of transistors is reduced.

The above-described embodiments of the present invention are intended to be illustrative only. Numerous alternative embodiments may be devised by those skilled in the art without departing from the scope of the following claims.

What is claimed is:

1. A pulse generator, comprising:
    a CMOS inverter including an input, an output, a first terminal connected to a source voltage and a second terminal connected to a first reference voltage;
    a capacitive device receiving a boost signal and connected to the input of the CMOS inverter; and
    a resistive device receiving a second reference voltage and connected to the input of the CMOS inverter;
    wherein pulses are generated at the output end of the CMOS inverter, and
    wherein the input of the CMOS inverter is capacitively coupled to the boost signal and the voltage of the boost signal rises or falls in nanoseconds.

2. The pulse generator of claim 1, wherein the first reference voltage is electrically grounded.

3. The pulse generator of claim 1, wherein the second reference voltage is electrically grounded.

4. The pulse generator of claim 1, wherein the second reference voltage is the source voltage.

5. The pulse generator of claim 1, wherein the resistive device receives a controlled signal for adjusting the widths of the pulses.

6. The pulse generator of claim 5, wherein the resistive device is a MOS transistor of a gate electrode receiving the controlled signal.

7. The pulse generator of claim 6, wherein the MOS transistor has an electrically grounded source or drain electrode.

8. The pulse generator of claim 1, wherein the resistive device is a resistor.

9. The pulse generator of claim 1, wherein the capacitive device is a MOS transistor.

10. The pulse generator of claim 9, wherein the drain electrode and source electrode of the MOS transistor receive the boost signal.

11. The pulse generator of claim 9, wherein the gate electrode of the MOS transistor receive the boost signal.

12. The pulse generator of claim 1, wherein the capacitive device is a capacitor.

13. The pulse generator of claim 1, wherein the source voltage is larger than the first reference voltage.

14. The pulse generator of claim 1, wherein the capacitive device is discharged through the resistive device.

15. The pulse generator of claim 1, wherein the widths of the pulses are down to a nanosecond level.

16. The pulse generator of claim 1, wherein the widths of the pulses can be adjusted by changing the capacitance of the capacitive device or the resistance of the resistive device.

17. A pulse generator, comprising:
    a CMOS inverter including an input, an output, a first terminal connected to a source voltage and a second terminal connected to a first reference voltage;
    a capacitive device receiving a boost signal and connected to the input of the CMOS inverter; and
    a resistive device receiving a second reference voltage and connected to the input of the CMOS inverter;
    wherein pulses are generated at the output end of the CMOS inverter, and
    wherein the boost signal increases from 0V to the source voltage.

18. A method for pulse generation, comprising:
    changing an output voltage of a CMOS inverter from a first level to a second level by boosting a capacitive device connected to the input of the CMOS inverter;

discharging the capacitive device through a resistive device connected to the input of the CMOS inverter; and changing the output voltage of the CMOS inverter from the second level to the first level when the charge stored in the capacitive device is lower than a threshold value;

wherein the widths of pulses of the output voltage are adjustable down to a nanosecond level.

19. The method for pulse generation of claim 18, wherein the capacitive device is a capacitor or a MOS transistor.

20. The method for pulse generation of claim 18, wherein the capacitive device is charged by a boost signal.

21. The method for pulse generation of claim 18, wherein the resistive device is a resistor or a MOS transistor.

22. The method for pulse generation of claim 18, further comprising changing the capacitance of the capacitive device or the resistance of the resistive device to adjust the widths of the pulses of the output voltage.

23. The method for pulse generation of claim 18, wherein the resistive device receives a control signal to adjust the widths of the pulses of the output voltage.

* * * * *